E. A. BARDWELL.
METHOD OR PROCESS OF NURLING.
APPLICATION FILED JUNE 19, 1917.
1,273,441.
Patented July 23, 1918.
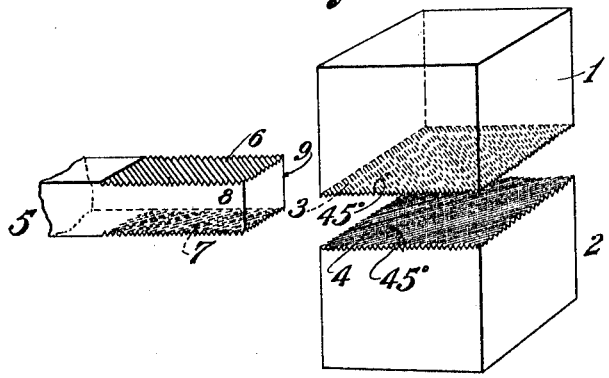
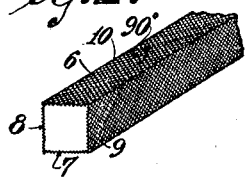
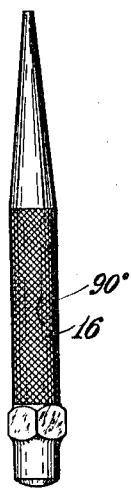
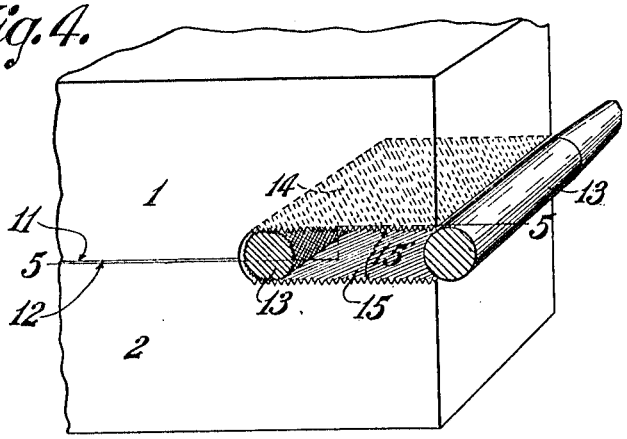
INVENTOR.
Edwin A. Bardwell.
BY
Harry W. Bourn.
ATTORNEY.
WITNESS:
B. H. Seaver.

UNITED STATES PATENT OFFICE.

EDWIN ALLEN BARDWELL, OF SHELBURNE FALLS, MASSACHUSETTS, ASSIGNOR TO H. H. MAYHEW COMPANY, OF SHELBURNE FALLS, MASSACHUSETTS, A CORPORATION OF MASSACHUSETTS.

METHOD OR PROCESS OF NURLING.

1,273,441.  Specification of Letters Patent.  Patented July 23, 1918.

Application filed June 19, 1917. Serial No. 175,642.

*To all whom it may concern:*

Be it known that I, EDWIN ALLEN BARDWELL, a citizen of the United States of America, residing in Shelburne Falls, in the county of Franklin and State of Massachusetts, have invented certain new and useful Improvements in Methods or Processes of Nurling, of which the following is a specification.

This invention relates to improvements in the method or process of nurling or embossing the cylindrical body of a percussion tool, as a nail set, the embossing being carried out during the process of forging the tool under the power hammer and while the metal is still in a hot condition. The process consists in first forging the tool to the required shape, then subjecting the same, while still in a hot condition, to the process of nurling or embossing to produce the usual nurled effect on the grip part of the tool.

Heretofore, it has been a common practice to produce the nurling on the body portion of the tool by means of a nurling tool which includes cutters having cutting surfaces of various designs. Such cutters are held against the body portion of the tool while it is revolved by any suitable means and until the nurled surface is completed. The nurled surface has also been produced by forging, but the shape of the nurling produced was irregular and in rectangular planes or lines. In the present invention the nurling or embossing is produced by means of two dies which simultaneously engage the oppositely located surfaces of the body portion composing the tool, said dies having corrugations or cutting ridges which extend in the same direction on the adjacent or opposite faces, or, 45 degrees to the side edges of the respective upper and lower dies. The purpose of embossing the tool is to produce a hand gripping surface, whereby the workman is enabled to better grasp the tool while using the same.

Referring to the drawings:

Figure 1 shows, conventionally, the upper and lower dies which are used in a power hammer or press, showing the cutting ridges arranged at an angle of 45 degrees to the sides of the dies and extending in the same direction with respect to each other and illustrating at the left of the figure a rectangular shaped piece that has been subjected to embossing or nurling blows, whereby the metal is formed with ridges on its opposite faces;

Fig. 2 illustrates the embossing or nurling on the four faces of the tool, the intersecting ridges composing the embossing being at 90 degrees to each other;

Fig. 3 shows the same embossing or nurling on a circular piece of metal, as applied to the gripping surface of a nail set;

Fig. 4 illustrates a pair of dies that are shown in contact at one edge thereof and spaced away or separated at the opposite side edge where the embossing ridges are formed, and showing the manner of embossing a circular percussion tool, the full lines at the right representing the position of the tool before it is rolled to the inside part of the die where it is shown in full lines.

Referring to the drawings in detail: 1 designates the upper die and 2 the lower die, the upper one being considered as mounted in and secured to the vertically reciprocating part of a power hammer. The die 2 is secured in a fixed position in the machine or power hammer. The contiguous, opposite and adjacently located embossing surfaces of the dies are formed with cutting ridges which are arranged at 45 degrees to the side edges of the dies, as indicated at 3 and 4, Fig. 1, and in the same direction, with the result that the serrations or cutting ridges on the oppositely arranged faces of the dies extend in the same direction.

The piece of metal that is to have a portion of its surface nurled is shown at the left of Fig. 1 at 5. This piece is first forged to the required shape by inserting the same between the surfaces 11 and 12 of the dies shown in Fig. 4 and while still hot is inserted between the dies 1 and 2, the upper vertically reciprocating die 1 forming the embossing or nurling indicated at 6 on the upper surface, and the lower fixed die 2 forming the nurling or embossing indicated at 7, on the lower surface. The piece is then withdrawn and the intermediate surfaces 8 and 9 are subjected to the forging or embossing process. The tool or piece is then turned still further or through 180 degrees from its original position producing the finished embossing or nurling effect as indicated in Fig. 2 on the four surfaces or faces, the ridges of which stand at 90 degrees to each other, as shown at 10. The same process is carried out in embossing or nurling a circular percussion tool or other article.

Referring to Fig. 4 the piece is first forged by inserting the same by hand between the smooth surfaces 11 and 12 and given a rolling motion by the operator until practically a circular form is produced, which are understood to be adjusted the correct distance apart, producing substantially the smooth circular article shown at the right of this figure, as indicated by the numeral 13. The dies 1 and 2 have the right hand portions partially cut away, and formed with the oppositely located embossing surfaces 14 and 15 which extend, as shown, substantially one half of the distance between the opposite right and left hand edges of the dies. The distance 15' between the dies is controlled or adjusted at the surfaces 11 and 12. The piece 13 is then rolled or moved by hand during the vertically reciprocating motion of the upper die 1, from the full line position, shown at the right of Fig. 4, to the full line position at the inner ends of the cut away portion between the dies producing the embossed effect shown in Fig. 3 with the embossed ridges at 90 degrees to each other, the embossed surface being indicated at 16. It is to be understood that the metal while being subjected to the embossing process as indicated in Fig. 4 is still hot thus making it easy for the dies to emboss or cut the ridges. It is to be understood that as the operator moves the piece 13 inward between the roughened surfaces of the dies 1 and 2, that either one or both of these dies are reciprocated into contact with the piece 13 and away from this piece, thus producing the embossed effect shown in Fig. 3.

It will be seen from this description that the process of embossing, nurling or imprinting a percussion tool is very rapidly and efficiently carried out while the metal to be embossed is still hot and that the embossing dies are so formed with the cutting ridges as to produce a finished article in which the embossing lines or ridges extend in the same direction thus producing substantially the same appearance as that produced by the ordinary tool and at a very much less expense. It is to be understood that applicant does not limit himself to any specific form of imprint or design that is to be produced on the tool, as other forms may be used without departing from the spirit and scope of the claims.

It is obvious from the above description that substantially a circular form will be imparted to the article during the forging process since the operator turns, by hand, the piece during the vertical movements of the upper die 1. It is also to be understood that the article does not assume the form of a perfect circle during the forging process, but substantially a circle before the article is inserted between the surfaces 14 and 15.

What I claim is:

1. The method of nurling or embossing which consists, first, in subjecting the metal to be embossed to a forging process by means of forging dies to reduce the same to substantially the dimensions of the finished article, next, subjecting the metal composing the article while still hot to the action of forging dies, the dies used in the forging process being formed with cutting ridges that are arranged at an angle to the side edges of the dies, and extending in the same direction, and said article that is being embossed being itself rotated about its axis during the embossing process to produce a surface on which the embossed or nurling grooves intersect each other at any desired angle.

2. The process of nurling or embossing an article which consists in subjecting the same to a forging process by means of dies, then subjecting said article to the action of the dies on the opposite or adjacent faces of which ridges are formed with cutting edges, said ridges extending in the same direction, and then manipulating the article so that the embossed grooves cut by one die will be intersected by the embossed grooves cut by the other die.

3. The process of embossing an article while in a hot condition which consists, first in forging the article by means of dies to substantially the dimensions of the finished article by inserting the same between a pair of said dies, then subjecting the article, while still hot, to the action of the same dies having embossing surfaces, the opposite faces of which are formed with cutting ridges which extend in the same direction to the side edges of the dies, whereby as the article is rotated between the dies the finished article will have an embossed surface whose ridges and grooves intersect each other, as described.

4. The method of nurling or embossing an article or tool, as a nail set, which consists in subjecting the stock to a forging process between a fixed and a movable die and simultaneously imparting a rotating motion to the stock until the desired form in cross section is produced, then subjecting the stock to the action of a die movable toward a fixed die, the opposite faces of which dies are formed with ridges for indenting the stock and simultaneously rotating the stock between the said faces during each action, as described.

EDWIN ALLEN BARDWELL.